Oct. 6, 1942. W. M. HANNEMAN 2,297,957
FASTENER DEVICE
Filed July 8, 1940
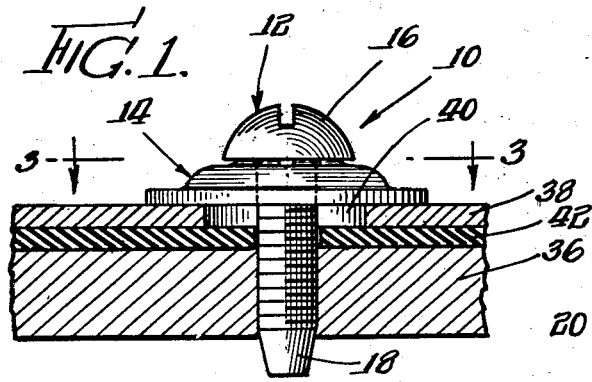
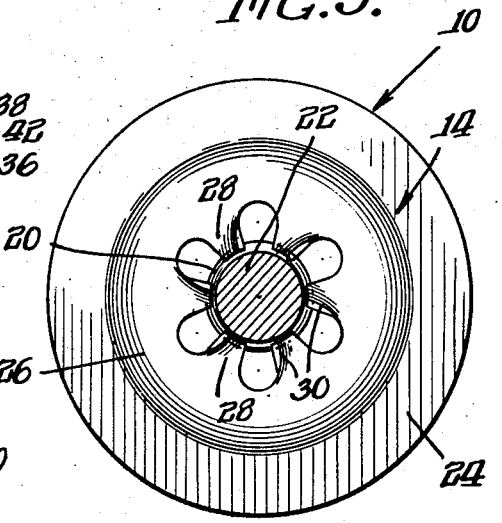
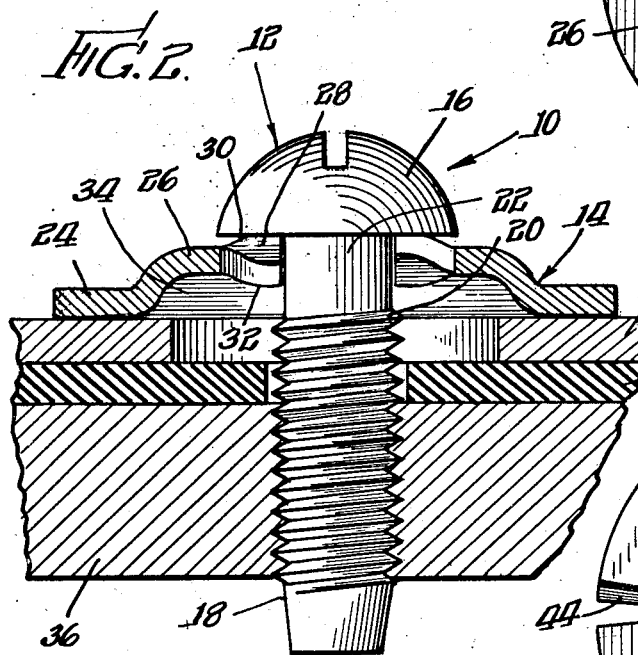
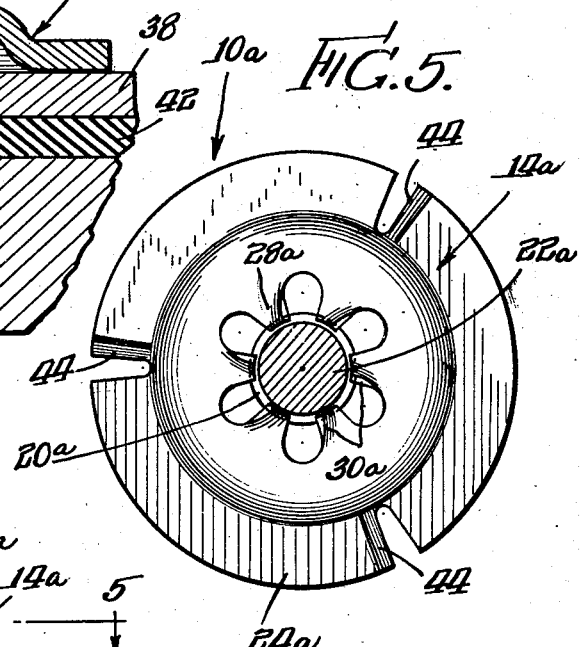
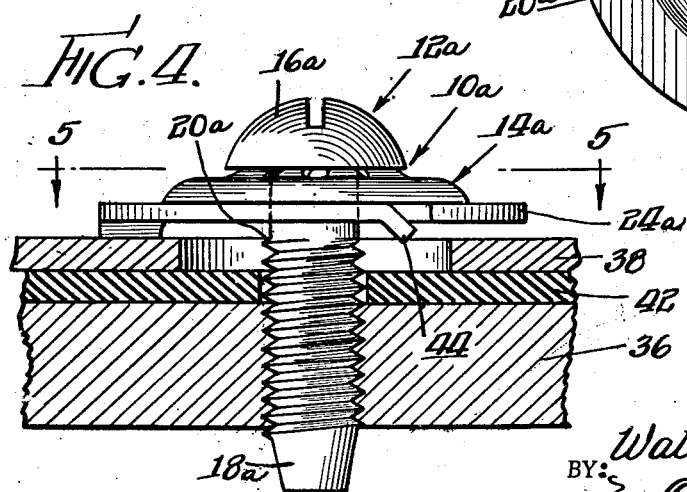
INVENTOR.
Walter M. Hanneman
BY Cox Moore & Olson
attys.

Patented Oct. 6, 1942

2,297,957

UNITED STATES PATENT OFFICE 2,297,957

FASTENER DEVICE

Walter M. Hanneman, Oak Park, Ill., assignor to Illinois Tool Works, Chicago, Ill., a corporation of Illinois Application July 8, 1940, Serial No. 344,360

2 Claims. (Cl. 151—35)

This invention relates generally to fastening devices and more particularly to fastening devices which include as one element thereof a washer capable of projecting well beyond the outer periphery of a companion screw head.

In some instances lock washers must be employed not only to secure a screw against retrograde rotation but also to cover a relatively large hole through which the screw member extends. In other words, screws are frequently used in instances where the part which is to be secured against a work piece is provided with apertures considerably larger than the diameter of the screw shank. In such applications it is difficult to secure a screw against retrograde rotation by means of a conventional lock washer. It is therefore one of the important objects of the present invention to provide an improved fastening device in which a lock washer along its inner margin is adapted to lockingly engage the under side of a screw head and along its outer margin positioned well beyond the periphery of the screw head is adapted to firmly engage a sufficient portion of the work surface so as to insure against inadvertent retrograde rotation.

The invention also contemplates a novel fastener unit or assembly in which a lock washer of the type referred to above is permanently assembled beneath the head of a screw.

More specifically, the invention contemplates a fastener unit as set forth above wherein a lock washer of special design is employed having its central portion cupped so as to increase its locking efficiency and also to enable relative axial movement between the washer and screw within predetermined limits and thus facilitate handling of the parts.

The foregoing and other objects will be more clearly appreciated when consideration is given to the following detailed description wherein:

Fig. 1 is a side elevational view of a fastening device constructed in accordance with the present invention, said device being shown in operative association with the work which is shown in section;

Fig. 2 is an enlarged view similar to Fig. 1 disclosing the lock washer as well as the work in transverse section;

Fig. 3 is an enlarged horizontal sectional view taken substantially along the line 3—3 of Fig. 1;

Fig. 4 is a view similar to Fig. 1 disclosing a fastening device employing a lock washer of slightly modified design; and Fig. 5 is an enlarged horizontal sectional view taken substantially along the line 5—5 of Fig. 4.

Referring now to the drawing more in detail wherein I have employed like numerals to designate similar elements and parts in the various figures, it will be seen that a fastening device embodying features of the present invention is designated generally by the numeral 10. This fastening device comprises a screw element 12 and a lock washer 14. The screw element 12 disclosed herein comprises a conventional head 16 and a shank 18. The screw thread 20 of the shank 18 is preferably rolled thereon, and an unthreaded shank portion or neck 22 extends between the uppermost of the thread convolutions 20 and the clamping side of the screw head 16. This shank portion 22 has a diameter which is less than the diameter of the screw threads 20 by an amount which is substantially equal to half the height of one of said threads. Prior to the rolling or extruding of the threads 20 on the shank 18, said shank has a diameter which is the same as the diameter of the neck portion 22. The rolling of the threads by the use of conventional thread rolling dies (not shown) causes an enlargement of the external diameter.

Prior to the rolling of the screw threads 20, the lock washer 14 is first telescopically associated with the unthreaded shank of the screw blank. The internal diameter of the lock washer 14 is sufficient to permit the insertion of the screw blank and when the threads are rolled upon the blank the external diameter is enlarged sufficiently so that the uppermost thread convolution provides a shoulder to prevent separation of the lock washer and screw. In my United States Patent No. 2,152,591 I have shown a machine and method whereby screw threads may be rolled upon the screw blank after preliminary telescopic assembly of a washer therewith.

Particular attention is directed to the novel design of the lock washer 14. The lock washer 14 includes three concentrically disposed sections. The outermost of these concentric or annularly disposed sections is designated by the numeral 24 and is positioned in a plane substantially normal to the screw axis. Positioned inwardly of the section 24 is a cupped or domelike section 26, and the third section comprises a plurality of resilient locking elements 28 providing teeth 30 projecting upwardly and teeth 32 projecting downwardly from the bounding planes of the washer stock in the section 26 immediately adjacent the roots or bases of the elements 28.

It will be noted that the disposition of the concentric or annular section 26 is such that only a shallow area 34 is defined by this section.

That is to say, the portion of the washer forming the section 26 is rather abruptly drawn or bent upwardly and inwardly, the inwardly extending portion lying in a plane which is slightly spaced from and in substantial parallelism with the plane of the section 24. By having this rather abruptly formed shallow cup, the outer margin of which is spaced a substantial distance inwardly from the outer periphery of the washer, I obtain the desired degree of firm resiliency to withstand the clamping action of the screw head against the washer teeth. By this structural arrangement the cupped section 26 resiliently opposes the clamping forces exerted against the teeth but does not yield prior to the firm locking engagement of the teeth 30 with the clamping surface of the screw head. This should be distinguished from conventional concavo-convex washer arrangements which yield readily in response to the initial clamping force exerted by the screw head. In such devices the maximum locking effectiveness of the washer teeth is not obtained because the teeth are not permitted to effectively lock against the clamping surface of the screw before the concavo-convex washer body yields.

It should also be noted that the provision of the washer section 24 of substantial width positioned within a plane which is substantially normal to the screw axis assures firm frictional engagement with the work surface. The clamping force exerted by the screw head is transmitted through the firmly resilient cupped section 26 to the relatively flat body portion or section 24, and this is sufficient to develop strong frictional resistance to any tendency for rotation of the lock washer with respect to the work.

The use of the fastening devices just described has proved very practical in applications of the type illustrated in Figs. 1 and 2. The mounting work piece 36 is tapped to receive the screw shank 18. A sheet 38 is provided with a relatively large aperture 40 to accommodate the screw shank 18, and interposed between the sheet 38 and the mounting work piece 36 is a gasket 42 of suitable resilient material. In this particular installation the aperture 40 must be relatively large in order to insure registration with the tapped hole in the work piece 36. Hence when a washer such as the washer 14 is employed which projects a suitable distance beyond the outer periphery of the screw head 16, the complete covering of the aperture 40 is insured and the required firm frictional engagement of the washer section 24 with the plate or sheet 38 is also obtained. By having a washer of the cross-section disclosed herein there is no possibility of the domed or cupped area thereof flexing downwardly toward the work to an extent which would ultimately spring the teeth away from the clamping surface of the screw head. This has been experienced in the use of other conventional types of washers of the aforesaid conventional concavo-convex form.

As previously pointed out, the relatively shallow and abruptly formed cupped section 26 cooperates with the radially extending flange or body section 24 in providing the required degree of resilient opposition to the clamping force exerted by the screw head. This enables firm interlocking of the washer teeth with the clamping surface of the screw head and a firm grip of the section 24 with the work surface without any collapsing of the cupped section 26.

The formation of the teeth should also be noted. The teeth are considerably broad or wide at their roots and relatively narrow at their free extremities. This serves to materially resist tendency for the teeth to bend at their roots when clamped in position.

In Figs. 4 and 5 a slightly modified arrangement is disclosed wherein the combined screw and lock washer is designated generally by the numeral 10a, the screw being designated generally by the numeral 12a and the lock washer by the numeral 14a. The only structural difference in the fastener unit 10a and the fastener unit 10 is in the provision of resilient work engaging locking teeth 44 extending below the plane of the washer body 24a. These teeth may be of any suitable design, each of the three teeth 44 as disclosed herein providing a radial edge capable of being forced against the surface of the sheet 38. In all other respects the lock washer 14a is similar to the lock washer 14 previously described. Teeth are provided along the outer annular section only in instances where the nature of the installation or application requires such construction. In both devices the same inherent firm resiliency of the cupped or domed section which is adapted to cooperate with the outer annular body section is present.

Another important and practical advantage of the fastening devices herein described is the provision of the neck portion 22 about which the lock washer elements 14 are positioned. It will be noted that the rolled or extruded thread 20 on the screw shank 18 terminates at a point spaced a substantial distance from the clamping surface of the screw head 16. In fact, when the screw head is tightened against the washer teeth as disclosed in Figs. 1, 2 and 4 the point of termination of the screw thread 20 lies in a plane which is substantially coincident with the plane of the surface of the outer lock washer section engaging the sheet or plate 38. By having the uppermost thread convolution 20 terminate a substantial distance short of the screw head, the lock washer is free to be shifted away from the clamping surface of the screw head prior to the insertion of the screw within the work. This materially facilitates manual gripping of the screw head 16 at the time the fastener unit is being initially applied to the threaded aperture of the work. The outer rounded surface presented by the abrupt bulge in the washer section 26 prevents gripping in this vicinity. Furthermore, if the washer is maintained in substantially contacting relation with the screw head during the manual manipulation or gripping thereof, the ease with which the unit may be handled, as by grasping the screw head 16, by the user's fingers is materially affected. Therefore, to accommodate the user's fingers I propose to terminate the upper thread convolution 20 a distance from the clamping surface of the screw head which is substantially equal to the over-all axial dimension of the lock washer.

From the foregoing it will be apparent that my invention contemplates an improved fastening device wherein a novel and highly practical lock washer is employed which is adapted to extend radially outward a substantial distance beyond an associated screw head. It will also be apparent that the invention presents a new and improved fastener unit or assembly in which a cupped or domed lock washer is secured against separation from a screw element by an extruded element such as an extruded or rolled thread spaced axially from the clamping surface of said screw element. Obviously, the invention is not limited to the specific structural details disclosed herein but is capable of other changes and modifications without departing from the spirit and scope of the appended claims.

Having thus described my invention, what I claim as new and desire to secure by Letters Patent is:

1. A locking device for headed screws, said device being comprised of resilient sheet stock and including integral inner, outer and intermediate annularly disposed sections with a central screw accommodating aperture, the inner and outer sections being parallel and in spaced planes normal to the axis of the aperture, the inner section having at its inner margin a plurality of radially extending, resilient locking teeth sprung out of the plane of said section for lockingly engaging the under side of the companion screw head, said outer section being formed of an annulus relatively broad in a radial direction and having an unrelieved area of substantial arcuate extent to form a broad washer base opposing axial compression and radial expansion of the washer as an inserted screw is tightened into a work piece, said intermediate section being formed by an annularly continuous, relatively shallow dome, the wall of which in axial cross section includes reversely curved end portions joined to form a side wall of the dome of such angularity to the planes of the inner and outer sections as to cause the locking teeth to lockingly engage the screw head before the washer yields to compression.

2. A locking device for headed screws, said device being comprised of resilient sheet stock including integral inner, outer and annularly disposed sections with a central screw accommodating aperture, the inner and outer sections being parallel and in spaced planes normal to the axis of the aperture, the inner section having at its inner margin a plurality of radially extending, resilient locking teeth sprung out of the plane of said section for lockingly engaging the under side of a companion screw head, said outer section being formed of an annulus relatively broad in a radial direction, portions of said annulus being relieved to form work engaging teeth projecting axially from the plane of the annulus and spaced apart by unrelieved areas of substantial arcuate extent to form a broad toothed washer base opposing axial compression and radial expansion of the washer sections as an inserted screw is tightened into a work piece, the intermediate section being formed by an annularly continuous, relatively shallow dome, the wall of which in axial cross section includes reversely curved end portions united to form a side wall of the dome of such angularity to the planes of the inner and outer sections as to cause the locking teeth of the inner section and the work engaging teeth of the outer section to lockingly engage the screw head and the work respectively before the washer yields to compression.

WALTER M. HANNEMAN.